Patented June 10, 1952

2,600,307

UNITED STATES PATENT OFFICE 2,600,307

METHOD OF MAKING METHYL-SUBSTITUTED DISILOXANE DIOLS

Glennard R. Lucas, Pittsfield, and Robert W. Martin, Lenox, Mass., assignors to General Electric Company, a corporation of New York No Drawing. Application March 15, 1950, Serial No. 149,886

11 Claims. (Cl. 260—448.2)

This invention is concerned with a method for making crystalline methyl-substituted tetraorganodisiloxane diols in which each silicon atom thereof contains a methyl radical attached thereto by a C—Si bond, e. g., tetramethyl disiloxane diol-1,3

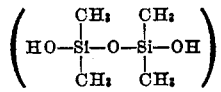

More particularly, the invention relates to a method for making crystalline methyl-substituted tetraorganodisiloxane diols described above, which comprises hydrolyzing with water a methylorganodihalogenosilane corresponding to the formula, CH₃RSiX₂, where R is a monovalent hydrocarbon radical, and X is a halogen, at a temperature below 25° C. under such conditions that the forming hydrogen halide is neutralized almost as fast as it is formed in the reaction mixture, the said hydrolysis being conducted while maintaining a pH of from about 5 to 10, e. g., from 6.5 to 8.0, during substantially the entire hydrolysis, and thereafter isolating the crystalline methyl - substituted tetraorganodisiloxane diol formed thereby.

In the past, the ability to obtain silicols as a result of the hydrolysis of an organohalogenosilane has been dependent on the organic radical attached to the silicon atom of the silane. In the case of phenylhalogenosilanes, for instance, diphenyldichlorosilane and triphenylchlorosilane, it has been possible to isolate the diphenyl silane diol and triphenyl silanol by hydrolysis of the corresponding phenylchlorosilane with little difficulty because of the decreased tendency of the hydroxyl groups to condense among themselves by virtue of the presence of the phenyl group on the silicon atom. In contrast to this when lower alkyl halogenosilanes, particularly methylchlorosilanes, are hydrolyzed, there are formed the monomeric silicols, but due to the reactivity of the hydroxyl groups in such silicols they intercondense almost immediately to form, in the case of the methyl silicols, a methylpolysiloxane so that up to the present time such compounds as the methyl silicols have never been isolated as such. As far as we are aware, no water-soluble, crystalline, low molecular weight, methyl polysiloxanes containing silicon bonded hydroxyl groups have been isolated heretofore. Even a halogenosilane such as diethyl dichlorosilane or ethyl phenyl dichlorosilane readily yields crystalline monomeric silicols or dimeric diols by the use of standard hydrolysis means as, for instance, by those disclosed by Robison et al. in J. Chem. Soc. 101, 2156 (1912). However, the presence of a methyl group on the silicon atom of the organohalogenosilane changes the tendency of the disiloxane diol to crystallize and also materially affects its stability. We have now discovered that we are able to isolate low molecular weight crystalline organodisiloxane diols corresponding to the general formula:

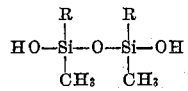

where R is in relatively good yields by employing a combination of said reaction conditions which as far as we are aware heretofore have not been used.

In accordance with our invention, which has for one of its more specific embodiments a method for preparing methyl disiloxane diols, a diorganodihalogenosilane corresponding to the formula CH₃RSiX₂ where R and X have the generic meanings given above, for example, dimethyldichlorosilane, is hydrolyzed with water under such conditions that the halogen halide resulting from the hydrolysis of the methylorganodihalogenosilane is neutralized in the water as fast as it is formed so that preferably at essentially all times the pH of the reaction mixture during the addition of the diorganodihalogenosilane is around 6.5 to 8.0, preferably around 7, any slight deviations for short periods of time from such pH of 7 being within the range of from about 5 to 10. Thereafter, the crystalline methyl organodisiloxane diol is isolated from the reaction mass.

R in the above formula for the methyl organodihalogenosilane may be an aliphatic radical such as, for example, a saturated or unsaturated aliphatic radical, for instance, vinyl, allyl, methallyl, propenyl, isopropenyl, butenyl, etc. radicals; methyl, ethyl, propyl, isopropyl, butyl, amyl, octyl, dodecyl, etc. radicals; an aryl radical (e. g., phenyl, naphthyl, anthracyl, etc.), an alkaryl radical (e. g., tolyl, xylyl, ethylphenyl, etc.), an aralkyl radical (e. g., benzyl, phenylethyl, etc.), cycloaliphatic radicals (e. g., cyclopentyl, cyclohexyl, cyclohexenyl, etc.), etc. If desired, all the foregoing hydrocarbon radicals may be substituted with substituents which are inert to any of the ingredients or conditions employed for preparing the methyl organodisiloxane diols as, for example, halogens, etc.

In carrying out our invention, we have found it preferable to conduct the hydrolysis of the methyl organodihalogenosilane (for purposes of brevity hereafter referred to as the "halogenosilane") by the simultaneous addition of the latter and a water-soluble base to an amount of water in excess of that required for complete hydrolysis of the halogenosilane while maintaining relatively low temperatures during essentially the entire hydrolysis reaction. The water-soluble base is used to neutralize the halogen halide liberated by the hydrolysis of the halogenosilane continuously and as fast as it is formed without causing any wide variations in pH either on the basic or acidic side during this process. This is the critical feature of our invention and must be observed carefully if one is to obtain optimum yields of the crystalline diol.

Stoichiometric quantities of materials are highly desirable to facilitate maintenance of a pH of around 7. However, it will be apparent to those skilled in the art that reasonable fluctuations for short periods of time of pH somewhat above and below 7 within the preferred range of from 5 to 10 may be tolerated without substantial effect upon the yield of the product. If the pH is maintained for appreciable lengths of time at either extreme of the pH range of say 5 to 10, or outside this range, serious reductions in yield will result. Our process is not to be confused with the disclosures in the prior art where a water-soluble base is added first to the water of hydrolysis prior to the addition of the halogenosilane. This latter procedure gives pH's which are too alkaline and which result in condensation of the formed silicols to organopolysiloxanes of greater length than the methyl organodisiloxane diols.

Among the bases which have been found adequate for the purpose are, for example, ammonia, either anhydrous or in aqueous solution, sodium hydroxide, potassium hydroxide, sodium carbonate, tetramethyl ammonium hydroxide, ethylene diamine, ethanolamine, etc. We prefer to use anhydrous ammonia because it is more easily handled because of its gaseous state and because better control of pH can be effected. Other similar bases or aqueous solutions thereof may also be employed without departing from the scope of the invention.

As pointed out previously, the hydrolysis is conducted substantially entirely within the pH ranging from about 5 to 10. A range which we have found desirable is that between a pH of 6 to 9, especially that range of from 6.5 to 8.0. In order to insure that the pH of the mixture is being maintained within the proper ranges and preferably around 7, it is desirable to employ pH indicators which show changes around the range of about 5 to 10, especially around 7. Among such indicators are, for instance, pairs of indicators such as bromthymol blue and phenolphthalein, etc. The indicators are preferably added to the water being used for hydrolysis purposes. Of course, a pH meter with a glass electrode may be used as the pH indicator for controlling the addition of the ingredients.

When using, for instance, the pair of indicators shown above, namely, bromthymol blue and phenolphthalein, the following are believed to be the reasons why this combination is especially effective in our reaction. According to the literature, bromthymol blue is yellow at a pH of around 6.0 and blue at a pH of 7.6. Phenolphthalein on the other hand is colorless at around 8.3 and red around a pH of 10. Thus, if the hydrolysis reaction mixture containing these two indicators shows a slightly bluish color, it will be apparent that the pH is being maintained very close to 7. If the color should change to yellowish, it will be apparent that the pH is dropping below 7 and it is then necessary to add additional amounts of base to the hydrolysis medium. If the color of the reaction mixture starts turning purplish due to the combination of blue of the bromthymol blue and the red from the phenolphthalein, it is again apparent that the pH is fluctuating above 8.0 so that it will then be necessary to increase the flow of the halogenosilane to bring the pH back to around 7.

The temperature employed during the hydrolysis, that is, in the hydrolysis medium, should be below room temperature and for optimum yields is preferably below 20° C., for example, about —5° to 15° C. This may be accomplished by using a slurry of ice in the hydrolysis medium in an amount sufficient to keep the temperature within the above-identified limits, replenishing the ice if necessary. As another alternative, a cooling bath may be used, for example, a Dry Ice-alcohol or Dry Ice-acetone bath may be used to jacket the reaction vessel containing the water to maintain the low temperatures. It is additionally desirable though not necessary that both the halogenosilane and the base be cooled prior to the addition of these ingredients to the hydrolysis medium.

As pointed out previously, the proportion of halogenosilane to water-soluble base should be such that sufficient base is employed to neutralize the halogen halide, for example, the hydrogen chloride, as fast as it forms during the hydrolysis. This may be accomplished by adding the organohalogenosilane and water-soluble base simultaneously in approximately stoichiometric equivalents; or, in the case of continuous hydrolysis, starting the addition of the ingredients and then ascertaining the necessity for increasing or decreasing the rate of addition of one of the ingredients by observing the pH. It is desirable, with particular reference to the use of gaseous ammonia, to use two mols of the latter per mol of methylorganodihalogenosilane. The examples below fully describe conditions which can be used in the practice of the invention.

The amount of water employed for hydrolysis purposes may also be varied within wide limits without departing from the scope of the invention. In order to insure complete hydrolysis, the water is present at least in an amount sufficient to effect complete hydrolysis of all the halogenosilane, and is preferably present in an amount in excess of that required for complete hydrolysis.

In order to fulfill the requirement for an amount of water sufficient to effect complete hydrolysis of the lower alkyl halogenosilanes and at the same time to maintain the lower temperatures desired for better yields, it has been found advisable to employ as the hydrolysis medium a mixture comprising ice and water, for instance, in the form of a slurry. An alternate method is to employ excess water and outside cooling of the reaction mixtures, e. g., cooling baths, as is pointed out above.

After the entire amount of halogenosilane has been added, the formed homogeneous aqueous solution is then saturated with a salt, for instance, NaCl, to cause insolubilization of the formed organodisiloxane diol in the aqueous solution. It has been found that this is best done by bringing the pH of the aqueous solution up to around 8.5 (e. g., by introduction of a small amount of additional base) prior to the addition of the NaCl. The crystalline diol will then separate from the saturated salt solution, especially if relatively low temperatures are employed, during the crystallization process. The separation of the crystalline material under the lower temperature conditions will ordinarily give better yields of the diol as well as less contamination of the crystalline diol with oily higher molecular weight, condensation products thereof. The period required for this crystallization step may vary, but generally we have found that it may range from about 2 to 6 or more hours during which essentially all the possible crystalline product will settle out. It is desirable that the period required for crystallization be kept as short as possible consistent with the obtainment of the optimum yield of product. This is due to the fact that contact of the crystalline diol with a hydrous medium for too long a period appears to diminish the yield of the final crystalline diol.

The crystalline product may then be filtered from the saturated aqueous solution preferably at temperatures below 20° C. to remove residual traces of salt and water, which, as pointed out above, may cause the diol to condense to higher molecular weight non-crystalline products. To insure the removal of the last traces of residual water from the methyl organodisiloxane diol, the latter is dissolved in an inert water-insoluble solvent for the diol, for example, hexane, petroleum ether, benzene, etc. Any residual water and salt will separate out as a lower phase which can be removed and the essentially pure crystalline product isolated from the water-insoluble solvent either by evaporation of the latter or by cooling of the organic solution to precipitate the crystalline diol. Under such circumstances, it is desirable to use organic water-insoluble solvents in which the crystalline methyl organodisiloxane diol is soluble at above room temperatures but relatively insoluble when the solution is cooled below room temperatures.

In order that those skilled in the art may better understand how the present invention can be practiced, the following examples are given by way of illustration and not by way of limitation.

*Example 1*

A few drops of bromthymol blue indicator were added to 1000 parts of a mixture of equal grams ice and water. While vigorously stirring this latter mixture, 179 grams dimethyldichlorosilane was added slowly while simultaneously sufficient aqueous ammonia was added to keep the solution at such a pH that the indicator registered a pale blue color in the hydrolysis medium. When all the dimethyldichlorosilane was added and the hydrolysis was complete, a water-insoluble oil (14 grams) was removed and the clear aqueous portion of the hydrolyzed silicon compound was extracted repeatedly with hot hexane, diethyl ether and finally with methylal. By this procedure, there was obtained 50 grams of crude crystalline tetramethyl disiloxane dial-1,3. There was also obtained 27 grams of a material of which a large amount comprised tetramethyl disiloxane diol-1,3.

Tetramethyl disiloxane diol-1,3 has a melting point of about 67° C., is soluble in warm hexane, and only slightly soluble in cold hexane. Analysis showed the compound to contain 8.42% hydrogen, 29.1% carbon and 33.64% silicon (theoretical values 8.42%, 28.95% and 33.78%, respectively). Its molecular weight by freezing point depression in dioxane was around 170 (theoretical 166.2). The per cent active hydrogen calculated as % OH (by the Zerwitinoff reagent) was equal to 20.2% (theoretical 20.4%), and the compound has 10.8% water of condensation (theoretical 10.83).

*Example 2*

In this example, 1500 grams water was placed in a large flask with a few drops of phenolphthalein indicator. The water was vigorously stirred and kept at 0° to 5° C. using an alcohol-Dry Ice bath, while 129 grams of dimethyldichlorosilane was added slowly simultaneously with sufficient gaseous ammonia to keep the mixture slightly pale pink. After the reaction was completed, a small amount of water-insoluble oil was removed and the remaining aqueous solution was chilled to −5° C. and vigorously stirred while 400 grams NaCl was added. Well-defined white crystals separated which were removed by filtration. These crystals, which weighed about 79.1 grams, melted to give a lower water phase amounting to about 29.6 grams and an oily phase amounting to about 48.5 grams. These phases were separated by decantation, and the oily phase was dissolved in pentane and when cooled gave about 27 grams of white needles of tetramethyl disiloxane diol-1,3.

*Example 3*

In this example, 15,000 grams water was mixed with small amounts of bromthymol blue and phenolphthalein to keep the pH between 6 and 9 during the reaction. The reaction vessel was cooled with a Dry-Ice-alcohol bath so that the temperature was around 18° to 19° C. 1290 grams dimethyldichlorosilane was bled into the water by means of a glass tube whose exit end extended deep into the bottom of the reaction vessel. At the same time, gaseous ammonia was also bled into the water by means of a tube whose exit end was situated at the bottom of the reaction vessel. The addition of the dimethyldichlorosilane and ammonia was maintained at such a rate as to hold the temperature of reaction between about 22.5° to 31.5° C. The pH during the addition of the ingredients was maintained so that the reaction mass remained in the light blue color range. In this case, it took about 1 hour and 43 minutes for the addition of the dimethyldichlorosilane. At the end of this time, 5,000 grams NaCl were added and the mixture stirred and allowed to stand for about 22 hours at a temperature of around 18° to 19° C. The entire contents of the reaction vessel were then extracted with hexane to give a final extraction product of about 3,000 cc., which was reduced to 1,500 cc. by distillation (67° C). This concentrated hexane solution was placed in cold storage (0–10° C.) for 20 hours, at the end of which time well-defined crystals had separated out which were removed by filtration, and washed with cold hexane to give 145 grams of essentially pure tetramethyl disiloxane diol-1,3. The reduced filtrate yielded an additional 31 grams of tetramethyl disiloxane diol-1,3.

*Example 4*

In order to improve the yield of tetramethyl disiloxane diol-1,3, the same procedure and ingredients as employed in Example 3 were used with the exception that the cooling bath for the water of hydrolysis was maintained at around −18° to −22° C. and the reaction temperature in the reaction vessel remained within the range of 4° to 8° C. The addition of the dimethyldichlorosilane was completed in about 56 minutes. After the sodium chloride was added, the mixture was allowed to stand for about 3 hours at −2° to −10° C., after which the liquid portion thereof was filtered and the filtrate was placed in cold storage (0–10° C.) for around 15 hours. The salt and oily crystalline product remaining in the reaction vessel were extracted with hexane and the extracted portion allowed to remain at around 25° C. for about 15 hours. Thereafter this latter extracted portion was warmed to dissolve the organic solid product therein, and the solution was then decanted from the salt and any water present. This solution was then placed in cold storage to give a yield of about 112.5 grams of crystalline product. The crystals which formed in the salt solution were also filtered and dissolved in warm hexane, and the hexane solution was then decanted from any water and salt present and also placed in cold storage to give a yield of crystalline product equal to about 191.5 grams. All the hexane filtrates were reduced by distillation to yield another 80 grams of crystalline material, making a total crystalline yield of about 384 grams of tetramethyl disiloxane diol-1,3 which was 46.3 per cent of the theoretical yield. In addition to the above-mentioned crystalline material, there was also obtained an oily product weighing about 292 grams and which probably comprised a mixture of polymeric dimethylsiloxanes.

*Example 5*

In this example, the same reactants as in Example 3 and the same proportion of ingredients were employed with the exception that the water of hydrolysis to which the dimethyldichlorosilane was lowered to about 2° C. by means of a Dry Ice and alcohol bath. The addition of the halogenosilane required about 43 minutes, and the bath temperature during the reaction was for the most part between −30° to −40° C. After the NaCl was added, the mixture was allowed to stand at around 0° to 10° C. for 3 hours and 40 minutes, after which the liquid was filtered and the filtrate placed in cold storage (0–10° C.) for about 15 hours. The oily crystalline product plus the salt remaining after the filtrate was removed were extracted with heaxane. The extraction mixture was warmed, the hexane solution was decanted from the salt and residual water, and the clear hexane solution was placed in cold storage. The final volume of solution was about 2,000 cc. The crystalline yield from the extracted oily product was 291 grams. The crystals formed in the original aqueous filtrate were removed by filtering and were dissolved in warm hexane. The final volume of this solution was 2,000 cc. which was placed in cold storage to yield 203 grams of crystals thus giving a total yield of 494 grams (58.5% of theoretical), indicating the advantages realized in maintaining the hydrolysis temperature as low as possible and the pH within the range of 6.5 to 8.0. The crystals were essentially pure tetramethyl disiloxane diol-1,3.

It will, of course, be understood that instead of the dimethyldichlorosilane employed above, other methyl organic dihalogenosilanes may be used as, for instance, dimethyldibromosilane, methyl cyclohexyldichlorosilane, methyl propyldichlorosilane, methyl isobutyldibromosilane, methyl isoamyldichlorosilane, methyl phenyldichlorosilane, methyl ethyldichlorosilane, methyl butyldichlorosilane, methyl tolyldibromosilane, methyl benzyldichlorosilane, methyl allyldichlorosilane, methyl vinyldichlorosilane, etc., may be employed without departing from the scope of the invention. Other examples will be clearly apparent from the assignment of organic radicals which have been given to the symbol R in the formula $CH_3RSiX_2$ where X is a halogen, for example, chlorine, bromine, fluorine, etc.

The water-soluble low molecular weight methylorganodisiloxane diols prepared in accordance with our invention have utility in the preparation of, for instance, rubbers, resins, etc., of the polysiloxane type. The tetramethyl disiloxane diol-1,3 is especially useful in making methyl polysiloxane elastomers because of the possibility of obtaining a polymer having a functionality of exactly 2 and which is uncontaminated by other copolymerized functional methyl siloxanes which may give undesirable properties in the finally cured silicone elastomers. These methylorganodisiloxane diols, particularly the tetramethyl disiloxane diol, also have utility as intermediates in the preparation of other compounds and resins, in which advantage can be taken of the presence of the hydroxyl groups on the disiloxanes for reaction with organic compounds containing radicals reactive towards such silicon-bonded hydroxyl groups.

Our claimed process also permits obtaining useful difunctional products from intermediates contaminated with undesirable materials. For instance, dimethyldichlorosilane containing small amounts of methyltrichlorosilane, which it is difficult to remove, may be converted to tetramethyl disiloxane diol-1,3 by our process which is completely free of trifunctional monomethylsiloxane.

What we claim as new and desire to secure by Letters Patent of the United States is:

1. The process of making a methylorganodisiloxane diol which comprises (1) hydrolyzing at a temperature below 25° C. while maintaining a pH of around 5 to 10 throughout essentially the entire period of hydrolysis, a diorganodihalogenosilane corresponding to the general formula $CH_3RSiX_2$ where R is a monovalent hydrocarbon radical selected from the class consisting of saturated aliphatic, unsaturated aliphatic, aryl, alkaryl, aralkyl, and cycloaliphatic radicals, and X is a halogen, and (2) isolating the formed methylorganodisiloxane diol.

2. The process for preparing a crystalline methylorganodisiloxane diol which comprises (1) hydrolyzing with water a diorganodihalogenosilane corresponding to the general formula $CH_3RSiX_2$ where R is a monovalent hydrocarbon radical selected from the class consisting of saturated aliphatic, unsaturated aliphatic, aryl, alkaryl, aralkyl, and cycloaliphatic radicals, and X is a halogen, while maintaining the temperature in the hydrolysis medium at around −5° to 20° C. and the pH of the hydrolysis medium from about 5 to 10 during the hydrolysis operation by neutralizing with an externally added neutralizing agent the halogen halide formed in the hydrolysis mixture substantially as fast as it forms, and (2) isolating the formed crystalline methylorganodisiloxane diol.

3. The process of preparing a crystalline methylorgandisiloxane diol which comprises (1) hydrolyzing with water a diorganodihalogenosilane corresponding to the general formula $CH_3RSiX_2$ where R is a monovalent hydrocarbon radical selected from the class consisting of saturated aliphatic, unsaturated aliphatic, aryl, alkaryl, aralkyl, and cycloaliphatic radicals, and X is a halogen, while maintaining the temperature in the hydrolysis medium below 25° C. and the pH of the hydrolysis medium essentially within the range of from about 5 to 10 by neutralizing the halogen halide formed in the hydrolysis mixture substantially as fast as it forms with ammonia, and (2) isolating the formed crystalline methylorganodisiloxane diol.

4. The process for preparing crystalline tetramethyl disiloxane diol-1,3 which comprises (1) hydrolyzing with water a dimethyldihalogenosilane while maintaining the temperature in the hydrolysis medium below 25° C. and the pH of the hydrolysis medium within the range of from 5 to 10 during the hydrolysis operation by neutralizing the formed halogen halide in the hydrolysis mixture substantially as fast as it forms with a neutralizing agent, and (2) isolating the formed crystalline tetramethyl disiloxane diol-1,3.

5. The process for preparing crystalline tetramethyl disiloxane diol-1,3 which comprises (1) hydrolyzing with water a dimethyldihalogenosilane while maintaining the temperature in the hydrolysis medium below 25° C. and the pH of the hydrolysis medium within the range of from 5 to 10 during the hydrolysis operation by neutralizing the formed halogen halide in the hydrolysis mixture substantially as fast as it forms with ammonia, and (2) isolating the formed crystalline tetramethyl disiloxane diol-1,3.

6. The process as in claim 4 wherein the dimethyldihalogenosilane is dimethyldichlorosilane.

7. The process as in claim 5 where the dimethyldihalogenosilane is dimethyldichlorosilane.

8. The process for preparing crystalline tetramethyl disiloxane diol-1,3 which comprises (1) hydrolyzing with water a dimethyldihalogenosilane while maintaining the temperature in the hydrolysis medium below 25° C. and the pH of the hydrolysis medium within the range of from 5 to 10 during the hydrolysis operation by neutralizing the formed halogen halide in the hydrolysis mixture substantially as fast as it forms with aqueous ammonia, and (2) isolating the formed crystalline tetramethyl disiloxane diol-1,3.

9. The method for preparing crystalline tetramethyl disiloxane diol-1,3 which comprises (1) slowly adding dimethyldichlorosilane and ammonia simultaneously to an amount of water maintained at a temperature of from −5° to 20° C. and at least in excess of that necessary to effect complete hydrolysis of the dimethyldichlorosilane while maintaining a pH in the hydrolysis medium during the addition of the ingredients of around 6.5 to 8.0 during substantially the entire hydrolysis operation by regulating the proportions of dimethyldichlorosilane and ammonia added so as to neutralize the hydrogen chloride formed in the hydrolysis mixture substantially as fast as it forms, and (2) isolating the formed crystalline tetramethyl disiloxane diol-1.3.

10. The method for preparing crystalline tetramethyl disiloxane diol-1,3 which comprises (1) slowly adding dimethyldichlorosilane and ammonia to a hydrolysis medium comprising water in an amount at least equal to that necessary to effect complete hydrolysis of the dimethyldichlorosilane and containing a pH indicator changeable around a pH of 6.5 to 8.0, the dimethyldichlorosilane and ammonia being added in approximately stoichiometric equivalents, and the hydrolysis medium being maintained at around −5° to 20° C. so that the pH of the hydrolysis medium is around 6.5 to 8.0 during substantially the entire hydrolysis operation, the ammonia being added in a way to neutralize the hydrogen chloride substantially as fast as it forms in the hydrolysis mixture, and (2) isolating the formed crystalline tetramethyl disiloxane diol-1,3.

11. The method for preparing crystalline tetramethyl disiloxane diol-1,3 which comprises (1) slowly adding dimethyldichlorosilane and sodium hydroxide simultaneously to an amount of water maintained at a temperature of from −5° to 20° C. and at least in excess of that necessary to effect complete hydrolysis of the dimethyldichlorosilane, while maintaining a pH in the hydrolysis medium during the addition of the ingredients of around 6.5 to 8.0 during substantially the entire hydrolysis operation by regulating the proportions of dimethyldichlorosilane and sodium hydroxide added so as to neutralize the hydrogen chloride formed in the hydrolysis mixture substantially as fast as it forms, and (2) isolating the formed crystalline tetramethyl disiloxane diol.

GLENNARD R. LUCAS.
ROBERT W. MARTIN.

REFERENCES CITED

The following references are of record in the file of this patent:

UNITED STATES PATENTS

| Number | Name | Date |
|---|---|---|
| 2,258,218 | Rochow | Oct. 7, 1941 |

OTHER REFERENCES

Volnov et al., "Jour. Gen. Chem.," (USSR) vol. 10, pages 1600–1604 (1940).